(12) United States Patent
Neubarth et al.

(10) Patent No.: US 9,671,300 B2
(45) Date of Patent: Jun. 6, 2017

(54) ELECTRONIC DEVICES WITH LOW-NOISE PRESSURE SENSORS

(71) Applicant: Apple Inc., Cupertino, CA (US)

(72) Inventors: Stuart K. Neubarth, Mountain View, CA (US); Michael A. Lehr, Mountain View, CA (US); David MacNeil, Cupertino, CA (US); Henry H. Yang, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 14/659,447

(22) Filed: Mar. 16, 2015

(65) Prior Publication Data

US 2016/0273986 A1    Sep. 22, 2016

(51) Int. Cl.
*G01L 9/00*    (2006.01)
*G01L 27/00*    (2006.01)

(52) U.S. Cl.
CPC .......... *G01L 9/0073* (2013.01); *G01L 9/0072* (2013.01); *G01L 9/0052* (2013.01); *G01L 27/002* (2013.01)

(58) Field of Classification Search
None
See application file for complete search history.

(56) References Cited

U.S. PATENT DOCUMENTS

| | | | |
|---|---|---|---|
| 8,712,713 B2 | 4/2014 | Wolf | |
| 8,781,420 B2* | 7/2014 | Schlub | H01Q 1/243 455/115.1 |
| 8,949,025 B2 | 2/2015 | Garin | |
| 9,071,336 B2* | 6/2015 | Schlub | H01Q 1/243 |
| 2012/0072110 A1 | 3/2012 | Venkatraman | |
| 2012/0290253 A1 | 11/2012 | Barrett et al. | |
| 2014/0012529 A1 | 1/2014 | Lee et al. | |
| 2014/0032161 A1 | 1/2014 | Das et al. | |

(Continued)

OTHER PUBLICATIONS

Walber, "Microphone Selection and Innovative Designs for Acoustics", PCB Piezotronics Inc., IMAC XXXII, Feb. 6, 2014, 43 pages. Retrieved from the Internet <http://sem.org/PDF/32i-microphoneselection_cmw.pdf> on Apr. 28, 2015.

*Primary Examiner* — Andre Allen
(74) *Attorney, Agent, or Firm* — Treyz Law Group, P.C.; Kendall W. Abbasi

(57) ABSTRACT

An electronic device may include one or more low-noise pressure sensors for measuring air pressure. The electronic device may include wireless communications circuitry for communicating with external devices also having pressure sensors. Pressure data gathered by an external device may be used as reference pressure data for the electronic device. For example, if both devices are located in the same building, both pressure sensors will detect similar pressure fluctuations due to doors opening and closing and temperature-control systems turning on and off. By subtracting the reference pressure data from the pressure data gathered by the electronic device, calibrated pressure data may be obtained and may be used to reliably detect vertical displacement changes of the electronic device. In other scenarios, the pressure data may be compared with the reference pressure data to determine whether the two devices are in the same room.

19 Claims, 15 Drawing Sheets

(56) References Cited

U.S. PATENT DOCUMENTS

| | | | | |
|---|---|---|---|---|
| 2015/0350822 A1* | 12/2015 | Xiao | ............ | H04W 4/02 455/456.1 |
| 2016/0069679 A1* | 3/2016 | Jackson | ............ | G01C 5/00 702/160 |
| 2016/0258749 A1* | 9/2016 | MacGougan | ............ | G01S 19/13 |

* cited by examiner

ELECTRONIC DEVICES WITH LOW-NOISE PRESSURE SENSORS

BACKGROUND

This relates generally to electronic devices and, more particularly, to electronic devices having pressure sensors for gathering information about the electronic device and the environment.

Electronic devices often include sensors and other circuitry for detecting movement of the electronic device and for characterizing its surroundings. For example, inertial sensors such as an accelerometer or gyroscope are sometimes used to detect a rapid change in acceleration or orientation. Global Positioning System receiver circuitry and/or IEEE 802.11 (WiFi®) transceiver circuitry are sometimes used to determine where the electronic device is located. Infrared proximity sensors are used to detect when an electronic device is being held against a user's ear during a telephone call so that display and touch sensor circuitry can be temporarily disable during the call.

However, decisions based on these types of sensors and circuitry may not always be reliable. Measuring vertical displacement with an accelerometer requires double integration of accelerometer data, and the noise associated with the accelerometer data may be too high to do this reliably. Global Positioning System receiver circuitry typically cannot be used inside of a building because the building blocks satellite signals. WiFi®-assisted positioning can be inaccurate due to multiple reflections of the radio signals. Infrared light from an infrared proximity sensor may be absorbed by dark hair, making it difficult to detect the user's head near the electronic device.

It would therefore be desirable to provide improved circuitry and methods for detecting and characterizing movement of an electronic device and the surrounding environment.

SUMMARY

An electronic device may include one or more low-noise pressure sensors for measuring air pressure. The electronic device may include wireless communications circuitry for communicating with external devices also having pressure sensors. Pressure data gathered by an external device may be used as reference pressure data for the electronic device.

For example, if both devices are located in the same building, both pressure sensors will detect similar pressure fluctuations due to doors opening and closing and temperature-control systems turning on and off. By subtracting the reference pressure data from the pressure data gathered by the electronic device, calibrated pressure data may be obtained and may be used to reliably detect vertical displacement changes of the electronic device.

For example, calibrated pressure data may be synthesized with motion sensor data from a motion sensor in the electronic device to detect and characterize movement of the electronic device. For example, the pressure sensor data may be used to detect when a user lifts the electronic device to his or her ear during a telephone call. If this lift-to-ear event is detected, a display and touch sensor in the electronic device may be temporarily disabled. If desired, pressure sensor data may be used to track a user's physical activity. For example, control circuitry in the electronic device may determine an altitude of the electronic device relative to the external device from which reference pressure data is received. Altitude information may in turn be used to determine a number of flights of stairs climbed by a user.

In other scenarios, the pressure data may be compared with the reference pressure data to determine whether the two devices are in the same room. If two pressure sensors are in the same room, the pressure-versus-time waveforms produced by the two sensors will reflect similar pressure transients common to the room. If the two pressure sensors are in the same building but in different rooms, the pressure-versus-time waveforms will reflect similar long-term changes in pressure common to the building but will detect different short-term fluctuations as a result of doors opening and closing in the different rooms.

In other scenarios, the pressure data may be used to characterize the environment in which the electronic device is being operated. For example, pressure data gathered by a pressure sensor in the electronic device may exhibit unique characteristics depending on the surrounding environment. Such characteristics can be learned and identified such that control circuitry in the electronic device can determine whether the electronic device is indoors, outdoors, in a car, in an airplane, in free fall, in water, or other environments.

DETAILED DESCRIPTION

Figure 1:
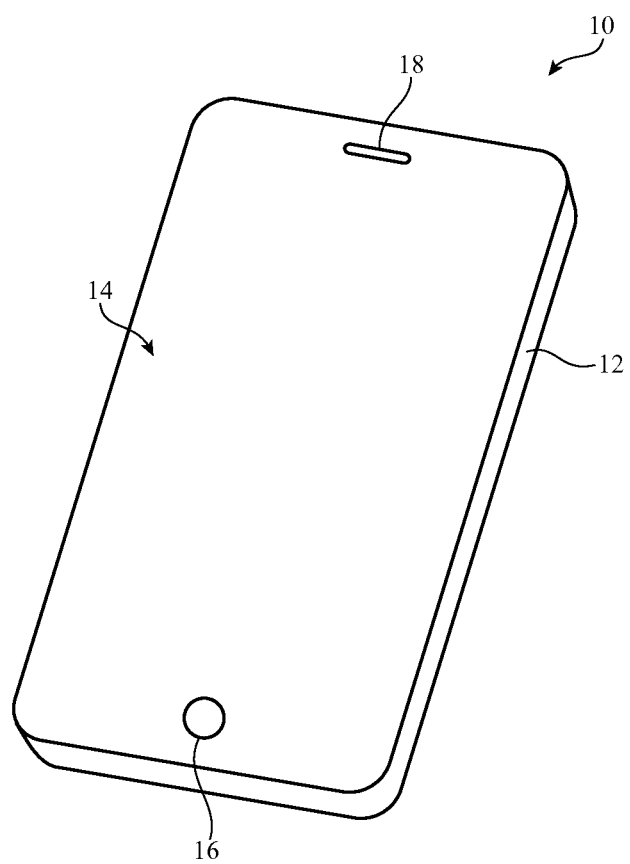
FIG. 1 is a perspective view of an illustrative electronic device that may be provided with one or more pressure sensors in accordance with an embodiment of the present invention.

An illustrative electronic device that may be provided with pressure sensor structures is shown in FIG. 1. Electronic device 10 of FIG. 1 may be a handheld electronic device or other electronic device. For example, electronic device 10 may be a cellular telephone, media player, or other handheld portable device, a somewhat smaller portable device such as a wrist-watch device, pendant device, or other wearable or miniature device, gaming equipment, a tablet computer, a notebook computer, a desktop computer, a television, a computer monitor, a computer integrated into a computer display, or other electronic equipment.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14, display 14 may contain an array of active display pixels. This region is sometimes referred to as the active area of the display. A rectangular ring-shaped region surrounding the periphery of the active display region may not contain any active display pixels and may therefore sometimes be referred to as the inactive area of the display. The display cover layer or other display layers in display 14 may be provided with an opaque masking layer in the inactive region to hide internal components from view by a user.

Figure 2:
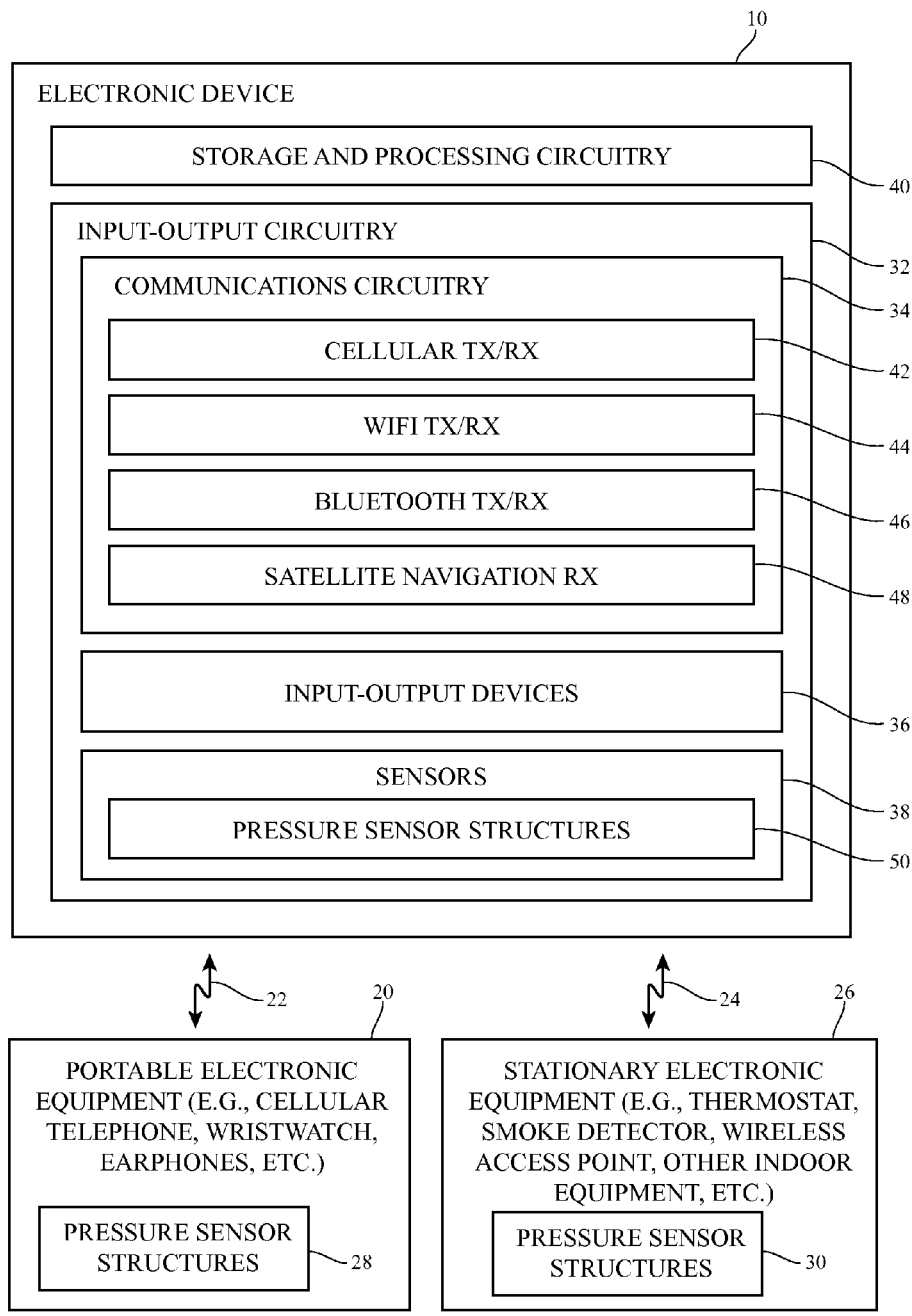
FIG. 2 is a schematic diagram of an illustrative electronic device and external equipment that may be provided with one or more pressure sensors in accordance with an embodiment of the present invention.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on one or more microprocessors, microcontrollers, digital signal processors, baseband processor integrated circuits, application specific integrated circuits, etc.

With one suitable arrangement, storage and processing circuitry 40 may be used to run software on device 10 such as internet browsing applications, email applications, media playback applications, activity logging applications, fitness applications, operating system functions, software for capturing and processing images, software implementing functions associated with gathering and processing sensor data, software that makes adjustments to display brightness and touch sensor functionality, etc.

To support interactions with external equipment, storage and processing circuitry 40 may be used in implementing communications protocols. Communications protocols that may be implemented using storage and processing circuitry 40 include internet protocols, wireless local area network protocols (e.g., IEEE 802.11 protocols—sometimes referred to as WiFi®), protocols for other short-range wireless communications links such as the Bluetooth® protocol, etc.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). As shown in FIG. 2, circuitry 34 may include one or more radio-frequency transceivers such as cellular telephone transceiver circuitry 42 (e.g., one or more cellular telephone transmitters and/or receivers), IEEE 802.11 (WiFi®) transceiver circuitry 44 (e.g., one or more wireless local area network transmitters and/or receivers), Bluetooth® transceiver circuitry 46 such as a Bluetooth® Low Energy (Bluetooth LE) transmitter and/or receiver, and satellite navigation system receiver circuitry 48 (e.g., a Global Positioning System receiver or other satellite navigation system receiver).

Input-output circuitry 32 may include input-output devices 36 such as buttons, joysticks, click wheels, scrolling wheels, touch screens, other components with touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, keyboards and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures. Sensors 38 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology). If desired, other components in device 10 may be formed using microelectromechanical systems technology.

To detect and characterize movement of electronic device 10 and to detect and characterize the environment around electronic device 10, sensors 38 may be provided with pressure sensor structures 50. Pressure sensor structures 50 (sometimes referred to as pressure sensor circuitry 50, pressure sensor array 50, or pressure sensors 50) may include one or more pressure sensors that measure the air pressure of the surrounding environment. Pressure sensors 50 may, for example, include absolute barometric diaphragm-based pressure sensors formed from piezo-resistors embedded in a micro-machined silicon diaphragm (sometimes referred to as a piezo-resistive pressure sensor). This is, however, merely illustrative. If desired, other suitable pressure sensor technology may be used (e.g., strain gauge based pressure sensors having a metal strain gauge on a metal diaphragm, capacitive based pressure sensors having a parallel plate capacitor structure on a diaphragm, other suitable microelectromechanical systems based pressure sensors, etc.). Pressure sensor structures 50 may include low-noise pressure sensors (e.g., with RMS noise of about 0.3 Pa or less at 1 atm).

To gather information about electronic device 10 and the surrounding environment, electronic device 10 may gather pressure sensor data from pressure sensors in external equipment such as pressure sensor structures 28 in portable electronic equipment 20 and/or pressure sensor structures 30 in stationary electronic equipment 26. Electronic device 10 may communicate with portable electronic equipment 20 using communications signals 22 and may communicate with stationary electronic equipment 26 using communications signals 24. Communications signals 22 and 24 may include Bluetooth® signals, wireless local area signals such as IEEE 802.11 signals, ultra-wideband radio frequency signals, other radio-frequency wireless signals, infrared signals, etc. Wireless signals 22 and 24 may be used to convey information such as pressure sensor data between electronic device 10 and external equipment 20 and 26.

Portable electronic equipment 20 may be an additional electronic device that a user of electronic device 10 carries on his or her person, or electronic equipment 20 may be an electronic device carried by a different user (e.g., a user not in possession of electronic device 10). Electronic equipment 20 may be a handheld electronic device or other portable electronic device. For example, electronic device 20 may be a cellular telephone, media player, or other handheld portable device, a somewhat smaller portable device such as a wrist-watch device, pendant device, or other wearable or miniature device, an accessory such as earphones, headphones, or earbuds, gaming equipment, a remote control, a tablet computer, a notebook computer, a desktop computer, a television, a computer monitor, a computer integrated into a computer display, or other electronic equipment. In one illustrative arrangement which is sometimes described herein as an example, electronic device 10 is a cellular telephone or other handheld computing device and electronic device 20 is a wearable electronic device such as a wrist-watch or a pair of headphones. This is, however, merely illustrative. In general, electronic devices 10 and 20 may be any suitable type of electronic equipment.

Stationary electronic equipment 26 may be an infrastructure-related device such as a thermostat, a smoke detector, a Bluetooth® Low Energy (Bluetooth LE) beacon, a WiFi® wireless access point, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device that may be stationary within or outside of a building.

Electronic device 10 may gather pressure sensor data from its own pressure sensor structures 50 and may also gather pressure sensor data from external pressure sensors such as pressure sensor structures 28 and 30 (sometimes referred to as reference pressure sensors). Pressure sensor data from internal pressure sensors 50 may be compared with reference pressure sensor data from external pressure sensors 28 and/or 30 to detect and characterize movement of electronic device 10 relative to external equipment 20 and 26.

Figure 3:
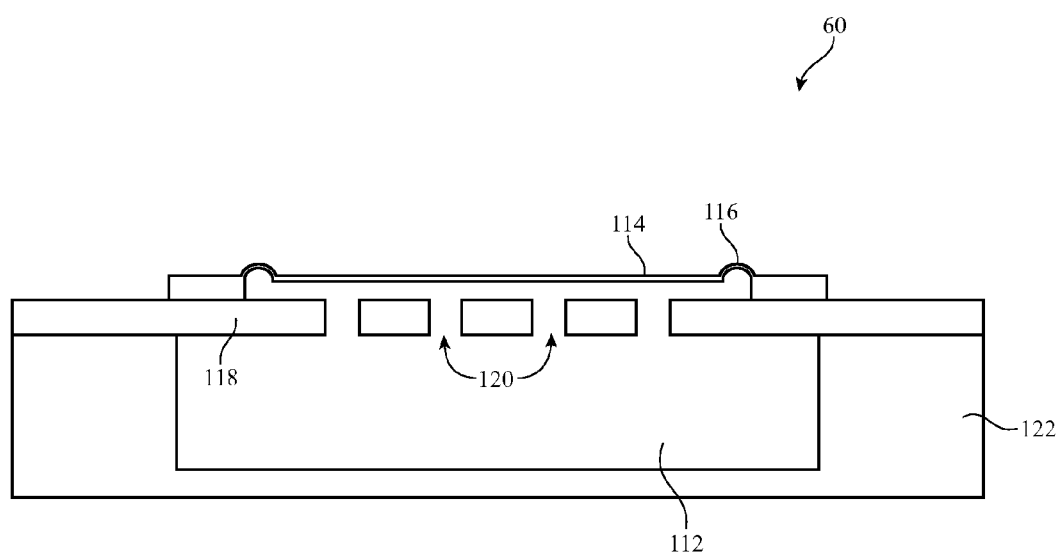
FIG. 3 is a cross-sectional side view of an illustrative pressure sensor formed from a condenser microphone in accordance with an embodiment of the present invention.

FIG. 3 is a cross-sectional side view of an illustrative pressure sensor 60 that may be used in pressure sensor structures 50, 28, and 30. In the example of FIG. 3, pressure sensor 60 is formed from a modified condenser microphone such as a microelectromechanical systems (MEMS) condenser microphone. Pressure sensor 60 may include a movable member such as flexible diaphragm 114 that is suspended over a cavity such as cavity 112 (sometimes referred to as a chamber) using suspension member 116. Diaphragm 114 may be free to move relative to a fixed structure such as backplate 118 and semiconductor substrate 122. Semiconductor substrate 122 may be formed using complementary metal-oxide-semiconductor (CMOS) technology, n-type metal-oxide-semiconductor (NMOS) technology, p-type metal-oxide-semiconductor (PMOS) technology, or other suitable semiconductor technology.

Semiconductor substrate 122 may include circuitry such as capacitive sensing electrodes that gather signals produced by movement of suspended diaphragm 114. Pressure waves that pass through holes 120 in backplate 118 will cause diaphragm 114 to move back and forth, causing the distance between diaphragm 114 and backplate 118 to vary which in turn changes the capacitance detected by circuitry in substrate 122. This capacitance change can be converted into an electrical signal indicating the amplitude of the incoming pressure wave.

To use a condenser microphone as a pressure sensor, different characteristics of the microphone can be modified. The size of cavity 112, the area and stiffness of diaphragm 114, and the compressibility of air in cavity 112 can play a factor in the low frequency response of sensor 60 and can be adjusted to achieve the desired response. For example, in a typical condenser microphone, vents are used for pressure equalization and low frequency roll-off. A vent allows air pressure to equalize between the front and back surfaces of the diaphragm to eliminate any low frequency response. To achieve a better low frequency response, sensor 60 may be formed from an unvented microphone.

Figure 4:
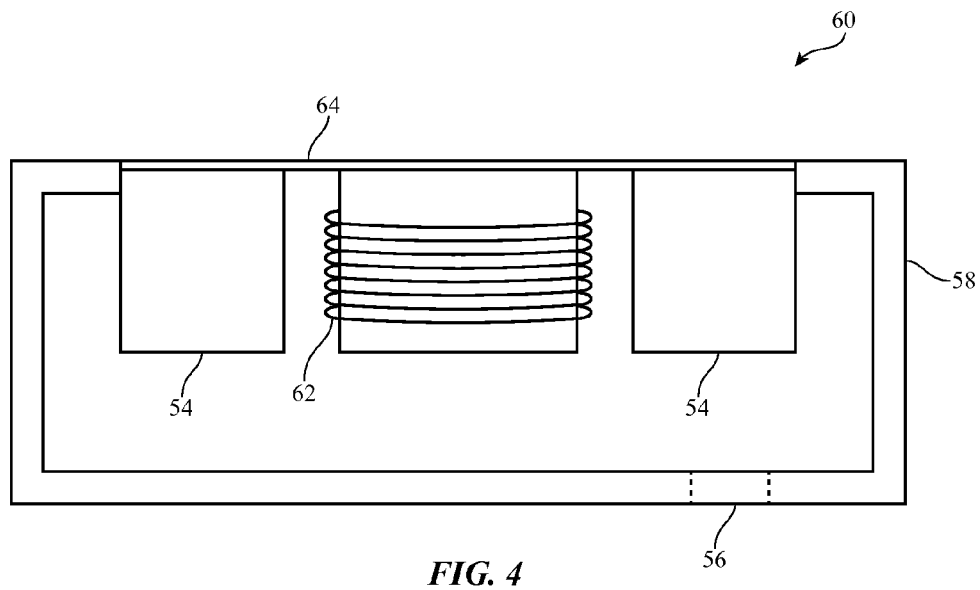
FIG. 4 is a cross-sectional side view of an illustrative pressure sensor formed from a dynamic microphone in accordance with an embodiment of the present invention.

The example of FIG. 3 in which sensor 60 is formed from a modified microelectromechanical systems condenser microphone is merely illustrative. If desired, sensor 60 may be formed from a modified electret microphone or other suitable microphone. In the example of FIG. 4, pressure sensor 60 is formed from a modified dynamic microphone. Pressure sensor 60 includes coil 62 attached to diaphragm 64. Coil 62 is placed in the magnetic field of permanent magnet 54. When pressure waves cause diaphragm 64 to vibrate, coil 62 moves in the magnetic field of magnet 54, thereby producing a current in coil 62 via electromagnetic induction. Pressure sensor 60 may be tuned to have a low frequency response (e.g., less than 1 Hz, less than 2 Hz, less than 5 Hz, etc.) by eliminating or blocking any vents such vent 56. By closing vent 56 (or eliminating the opening entirely), the microphone structure may be used as a low-noise pressure sensor.

The example of FIG. 4 in which coils 62 are surrounded by magnet 54 is merely illustrative. If desired, permanent magnet 54 may be located in the center of sensor 60 and coils 62 may be wrapped around permanent magnet 54.

Figure 5:
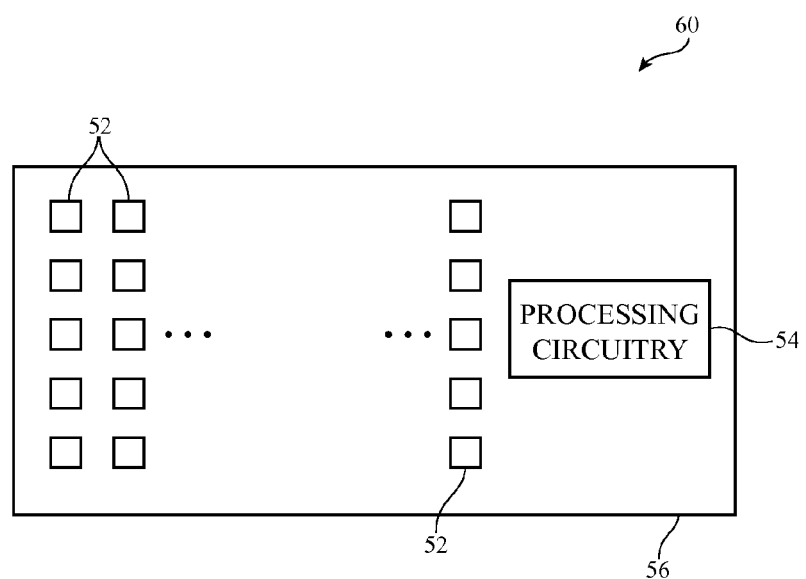
FIG. 5 is a top view of an illustrative array of pressure sensors in accordance with an embodiment of the present invention.

FIG. 5 is a top view of another illustrative arrangement for a pressure sensor 60 that may be used in pressure sensor structures 50, 28, and 30. In the example of FIG. 5, pressure sensor 60 is formed from an array of pressure sensors (e.g., an array of individual microelectromechanical-systems-based pressure sensors). Pressure sensors 52 may be mounted to a common substrate such as printed circuit substrate 56. Processing circuitry such as processing circuitry 54 (or other suitable processing circuitry) may combine sensor signals from pressure sensors 52 to obtain a combined sensor signal. When combining sensor outputs, the sensor signal increases linearly with the number of sensors while the noise level of the combined signal increases only with the square root of the number of sensors. Accordingly, the combined sensor signal may have a significantly higher signal-to-noise ratio (SNR) than the corresponding signal from a single sensor. For example, in arrangements where sensor array 60 includes 64 pressure sensors 52, the signal will grow by 64 times while the noise will only grow by the square root of 64 (8 times), and the overall SNR will be improved by a factor of 8. If desired, individual sensors 52 may be monitored such that any failed sensor can be excluded from the signal combining process.

The accuracy of pressure sensors and microphones is compromised by noise sources in the internal electronic circuitry that amplifies, filters, and digitizes the sensed signals. These internal electronic noise sources include principally thermal noise, shot noise, and flicker noise. An additional, often insignificant internal noise source in is produced by thermal noise from air molecules striking the sensor diaphragm. All of these internal noise sources are uncorrelated with one another. The internal noise sources from one sensor are also uncorrelated with the noise sources from other sensors. Consequently, when combining sensor outputs, the sensor signal increases linearly with the number of sensors while the noise level of the combined signal increases only with the square root of the number of sensors. Accordingly, the combined sensor signal may have a significantly higher signal-to-noise ratio (SNR) than the corresponding signal from a single sensor.

If desired, pressure sensor structures 50 of FIG. 2 may include different types of pressure sensors such as an absolute pressure sensor and an unvented microphone pressure sensor of the type described in connection with FIG. 3. An absolute pressure sensor typically measures the displacement of a diaphragm either through a piezo-resistive strain gauge or through a capacitive gap sensor. A microphone typically responds to either the velocity of a diaphragm or to relatively short-term changes to the displacement of a diaphragm. Since some absolute pressure sensors can produce signals with an excessive amount of noise, combining data from an absolute pressure sensor with data from an unvented microphone can provide a more accurate reading of barometric pressure changes. The microphone may provide low noise information about short-term changes in pressure while the absolute pressure sensor can provide absolute pressure information. Processing circuitry 54 (and/or processing circuitry 40 of FIG. 2) can combine pressure sensor signals by adding the signals together and/or using adaptive filter techniques.

In another suitable arrangement, low-noise pressure sensor data can be gathered by combining an absolute sensor with an additional pressure sensor having a sealed chamber behind a diaphragm at 1 atmosphere. If desired, the diaphragm of the additional pressure sensor may be more compliant than that of the absolute pressure sensor, and mechanical stops may be used to limit diaphragm displacement under large deviations from 1 atmosphere.

Figure 6:
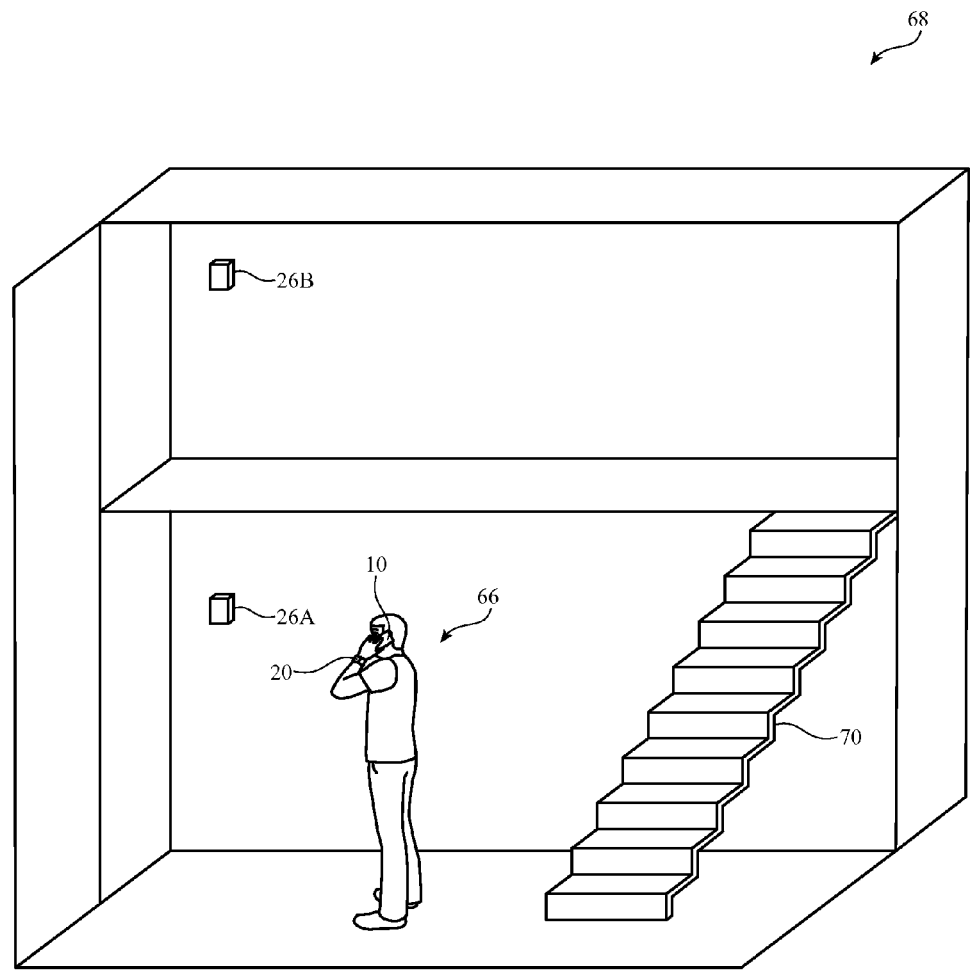
FIG. 6 is a sectional view of an illustrative building in which electronic equipment having pressure sensors may be used in accordance with an embodiment of the present invention.

Using the low-noise pressure sensor of FIG. 3, the low-noise pressure sensor of FIG. 4, the low-noise pressure sensor array of FIG. 5, and/or one or more absolute pressure sensors may enable electronic device 10 to make more intelligent decisions about the movement of electronic device 10 and the environment in which electronic device 10 is operating. FIG. 6 is a sectional view of an illustrative environment in which a user may operate electronic device 10. In this illustrative scenario, user 66 is located on the first floor of a two-story building 68. User 66 may have multiple electronic devices such as handheld electronic device 10 and wearable electronic device 20. Building 68 may include stationary equipment such as equipment 26A on the first floor and equipment 26B on the second floor. Equipment 26A and 26B may be thermostats, wireless access points, or other suitable electronic equipment described in connection with FIG. 2. As user 66 moves within building 68, electronic device 10 may gather pressure sensor data from its internal pressure sensor (sensor 50 of FIG. 2) and may gather pressure sensor data from one or more external pressure sensors associated with external equipment 20, 26A, and/or 26B. By comparing sensor data from its internal pressure sensor with sensor data from an external pressure sensor, control circuitry 40 in electronic device 10 may accurately detect and characterize movement of electronic device 10 and may take suitable action based on how electronic device 10 moves and/or based on the environment in which electronic device 10 moves.

For example, control circuitry 40 in electronic device 10 may compare pressure sensor signals from internal pressure sensor 50 with reference pressure signals from an external device (e.g., device 20, 26A, or 26B) to determine an altitude of electronic device 10 relative to the external device. When the external device is located in the vicinity of electronic device 10, both devices will be subject to similar changes in pressure caused by doors opening and closing, temperature control systems turning on and off, etc. Control circuitry 40 may therefore use the reference pressure signals from the external device to remove the pressure fluctuations common to the environment from the signal from internal pressure sensor 50.

Vertical displacement information may be used to determine when user 66 lifts electronic device 10 to his or her ear, when user 66 climbs a flight of stairs (e.g., stairs 70 of FIG. 6), when user 66 accidentally drops electronic device 10, and/or when user 66 performs other movements with electronic device 10. If desired, control circuitry 40 may use pressure sensor data to augment motion sensor data from an inertial sensor in electronic device 10 (e.g., an accelerometer and/or a gyroscope) to detect and characterize movement (e.g., altitude changes) of electronic device 10.

As another example, control circuitry 40 in electronic device 10 may compare pressure sensor signals from internal pressure sensor 50 with reference pressure signals from an external device to determine whether the two devices are in the same room or whether the two devices are in the different rooms in the same building. In other scenarios, control circuitry 40 in electronic device 10 may compare pressure sensor signals from internal pressure sensor 50 with a predetermined reference signal stored in electronic device 10 to determine what type of environment electronic device 10 is located in (e.g., indoors, outdoors, in a car, in an airplane, in water, etc.).

Figure 7:
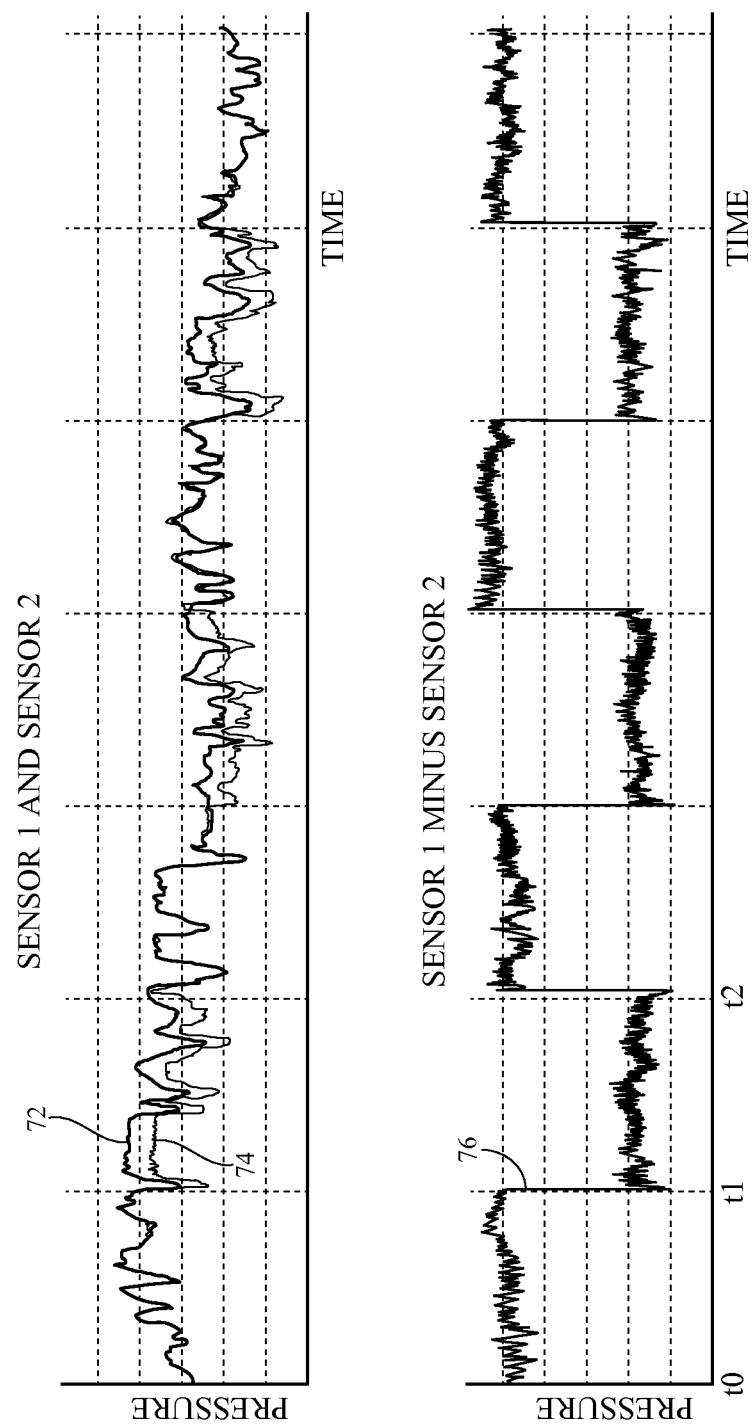
FIG. 7 shows illustrative pressure sensor data from first and second pressure sensors that may be used to determine the altitude of a first electronic device relative to a second electronic device in accordance with an embodiment of the present invention.

FIG. 7 shows illustrative sensor data that may be used to determine the altitude of electronic device 10 relative to an external device such as device 20 or device 26 of FIG. 2. The upper graph of FIG. 7 shows sensor data 72 from pressure sensor 1 (e.g., pressure sensor 28 in device 20 or pressure sensor 30 in device 26) and sensor data 74 from pressure sensor 2 (e.g., pressure sensor 50 in electronic device 10). From time t0 to time t1, a user holds sensor 1 at the same height relative to sensor 2. From time t1 to time t2, the user lifts sensor 2 several inches above sensor 1. As shown in the upper graph of FIG. 7, sensor data 72 and sensor data 74 reflect fluctuations in ambient pressure in the room as doors are opened and closed and as a temperature-control system turns on and off. Sensor data 74 from sensor 2 reflects a drop in pressure from time t1 to time t2 as it is lifted above sensor 1.

The lower graph of FIG. 7 illustrates a calibrated sensor signal obtained by subtracting the sensor 2 signal from the sensor 1 signal. Performing this operation removes some of the local atmospheric pressure changes brought about by doors opening and closing and by temperature-control systems being turned on and off. The difference signal may therefore be used to reliably detect when electronic device 10 undergoes changes in altitude. Vertical displacement information may, for example, be used to detect when a user lifts electronic device 10 to his or her ear. If desired, control circuitry 40 in electronic device 10 may use pressure sensor data to augment motion sensor data from one or more inertial sensors in electronic device 10 to determine when electronic device 10 is lifted to a user's ear.

Figure 8:
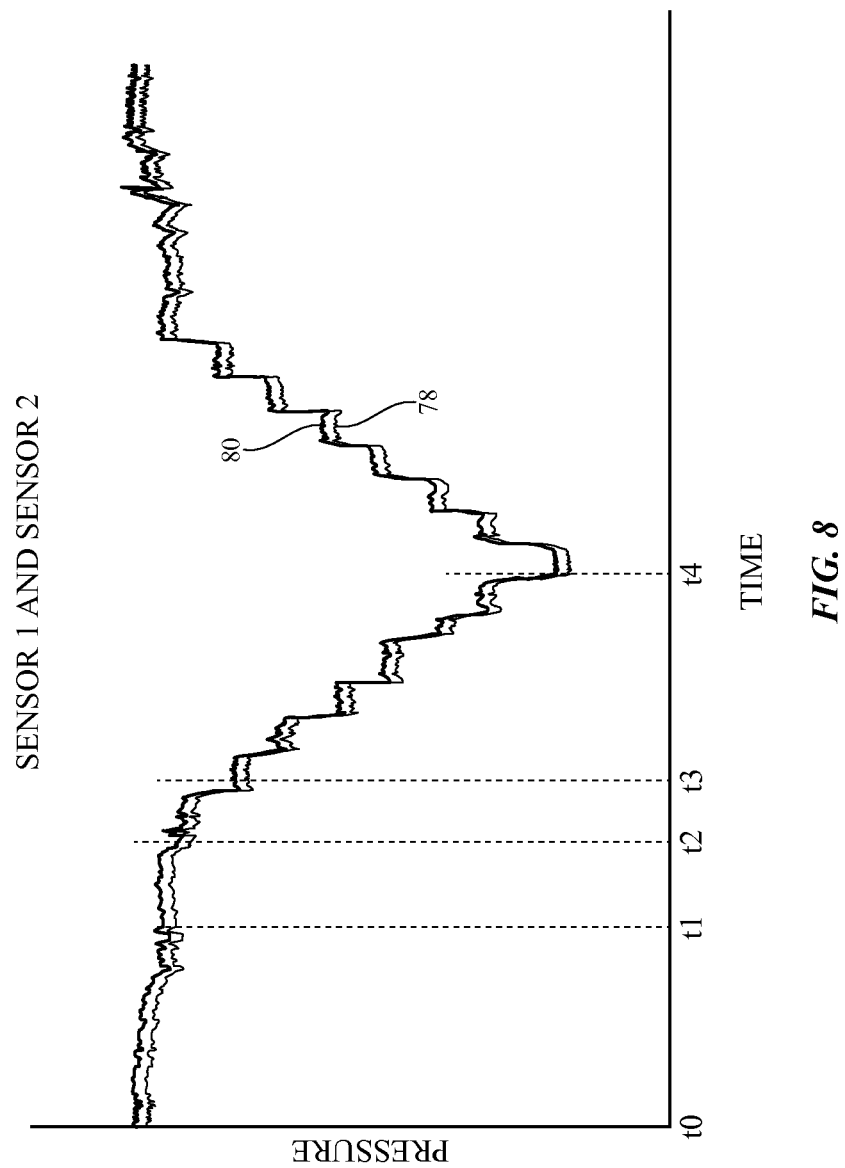
FIG. 8 shows illustrative pressure sensor data that may be used to characterize a user's movement and activity in accordance with an embodiment of the present invention.

FIG. 8 shows illustrative sensor data that may be used to track a user's physical activity. The graph of FIG. 8 shows sensor data 78 from pressure sensor 1 (e.g., pressure sensor 28 in device 20) and sensor data 80 from pressure sensor 2 (e.g., pressure sensor 50 in electronic device 10). In this illustrative scenario, a user carries both device 10 and device 20 on his or her person as various activities are performed. Device 10 may be in the user's pocket, for example, and device 20 may be on the user's wrist.

FIG. 8 illustrates how different characteristics of the pressure versus time waveform can be used to identify the location and activity of the user as it moves with device 10 and 20. In this illustrative scenario, the user starts in a first building, walks outside to a second building, climbs a set of stairs in the second building, descends back down the set of stairs, and returns to the first building. From time t0 to time t1, the user is located in the first building, and both sensor 1 and sensor 2 detect similar fluctuations in the ambient pressure in the first building. From time t1 to time t2, the user walks outside from the first building to the second building. When the sensors are outside from t1 to time t2, the sharp spikes in air pressure that are characteristic of being indoors are not detected. From time t2 to time t3, the user is located in the second building, and both sensor 1 and sensor 2 detect similar fluctuations in the ambient pressure in the second building. As shown in FIG. 8, the frequency of spikes in air pressure when the user is in the first building is different than the frequency of spikes in air pressure when the user is in the second building. From time t3 to time t4, sensor 1 and sensor 2 detect a stepped decrease in pressure as the user climbs a flight of stairs in the second building.

FIG. 8 illustrates that, with low-noise pressure sensors in electronic device 10, electronic device 10 can detect and characterize movement of electronic device 10 and the environment in which electronic device 10 moves. The presence or absence of sharp spikes in ambient pressure are indicative of whether the device is indoors or outdoors. The stepped decrease or increase in pressure is indicative of stairs being ascended or descended. If desired, control circuitry 40 in electronic device 10 may use pressure sensor data (e.g., data of the type shown in FIG. 8) along with sensor data from motion sensors in electronic device 10 to characterize and track movement of electronic device 10.

Figure 9:
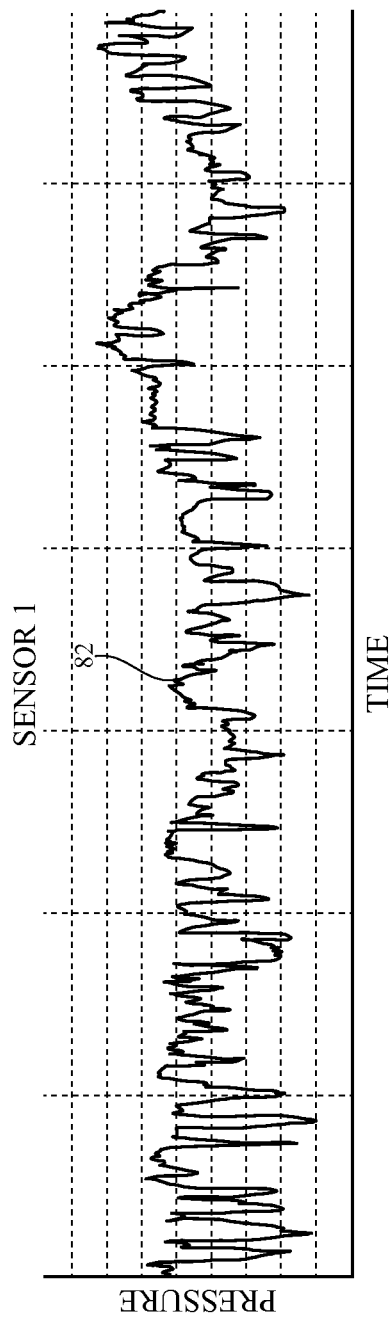
FIG. 9 shows illustrative pressure sensor data from first and second pressure sensors that may be used to determine whether first and second electronic devices are in the same room in accordance with an embodiment of the present invention.
Figure 9:
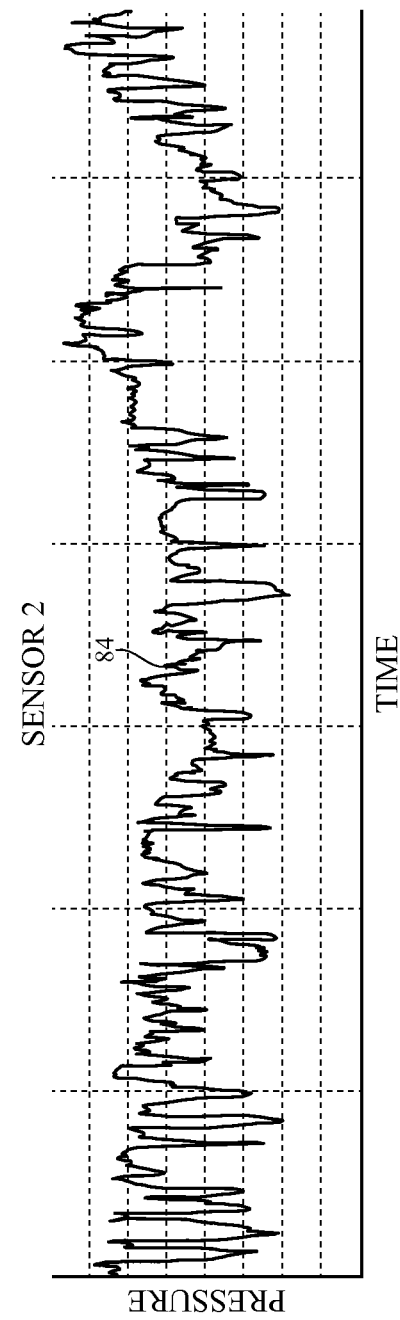

FIG. 9 shows illustrative sensor data that may be used to determine whether first and second devices are in the same room. The graph of FIG. 9 shows sensor data 82 from pressure sensor 1 (e.g., pressure sensor 28 in device 20 or pressure sensor 30 in device 26) and sensor data 84 from pressure sensor 2 (e.g., pressure sensor 50 in electronic device 10). In this illustrative scenario, both sensor 1 and sensor 2 observe highly correlated pressure-versus-time waveforms. Short-term fluctuations are due to doors opening and closing, while longer term pressure changes are due to changes from a temperature-control system.

Electronic device 10 may use pressure sensor information (e.g., sensor data of the type shown in FIG. 9) to determine if a user or device is located within a room or to determine if multiple devices are in the same room. This information may sometimes be useful for security purposes. For example, access to a wireless network may be restricted to those verified to be physically present in a particular room or building, and access will be blocked to devices located outside the building. Using pressure sensor data to help locate an electronic device may be useful in situations where other location detection methods are known to have difficulties (e.g., indoors where satellite signals are blocked).

Figure 10:
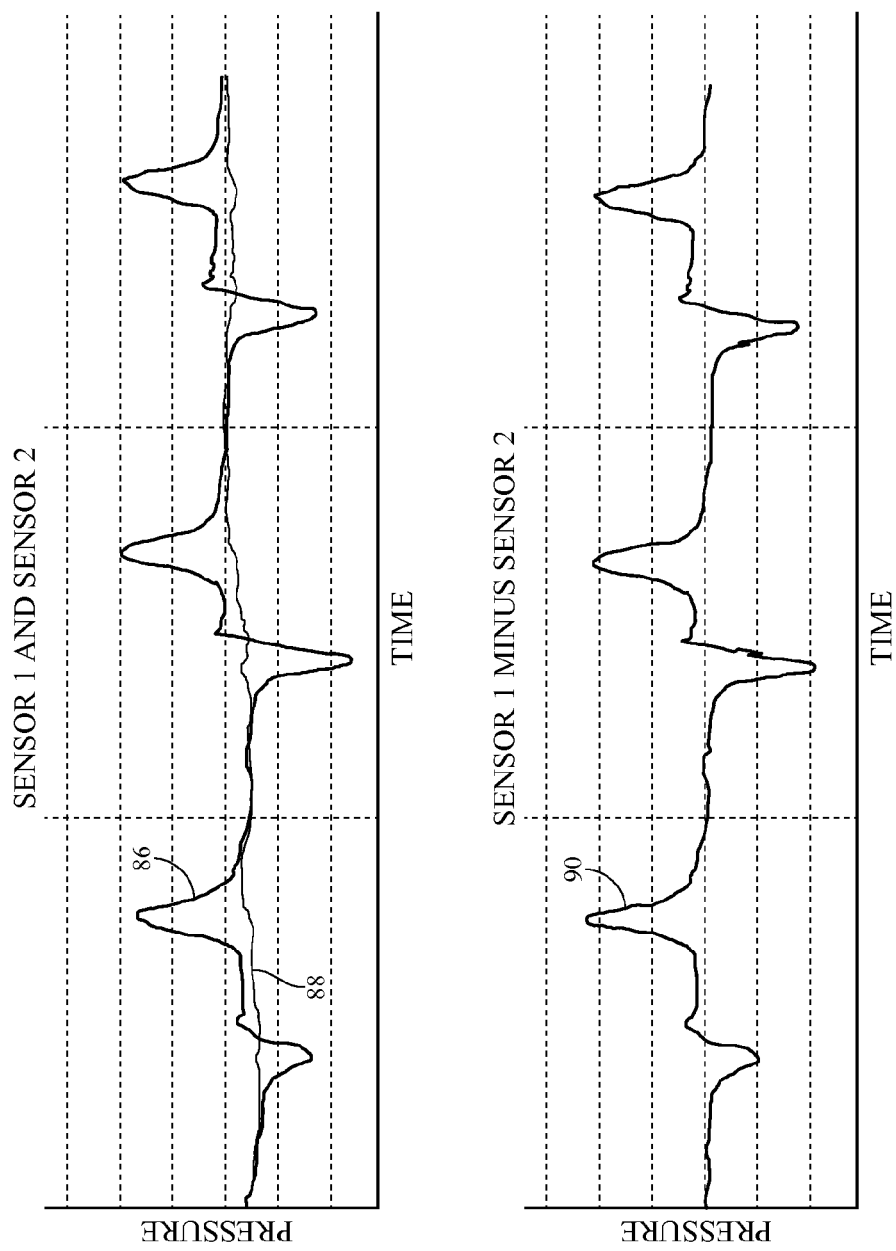
FIG. 10 shows illustrative pressure sensor data from first and second pressure sensors that may be used to determine whether first and second electronic devices are in the same building in accordance with an embodiment of the present invention.

FIG. 10 shows illustrative sensor data that may be used to determine whether first and second devices are in the same building. The graph of FIG. 10 shows sensor data 86 from pressure sensor 1 (e.g., pressure sensor 28 in device 20 or pressure sensor 30 in device 26) and sensor data 88 from pressure sensor 2 (e.g., pressure sensor 50 in electronic device 10). In this illustrative scenario, sensor 1 is inside a 10 by 10 foot room in the building, whereas sensor 2 is outside the room in a common area of the building. Both sensor 1 and sensor 2 detect a slight continuous increase in background pressure in the building. Pressure sensor 1, however, detects sharp fluctuations in pressure when the door to the room is opened and closed, while pressure sensor 2 remains relatively stable. FIG. 10 therefore illustrates that pressure sensor data can not only be used to detect whether two devices are in the same room, but also to detect whether two devices are in the same building but in different rooms.

Figure 11:
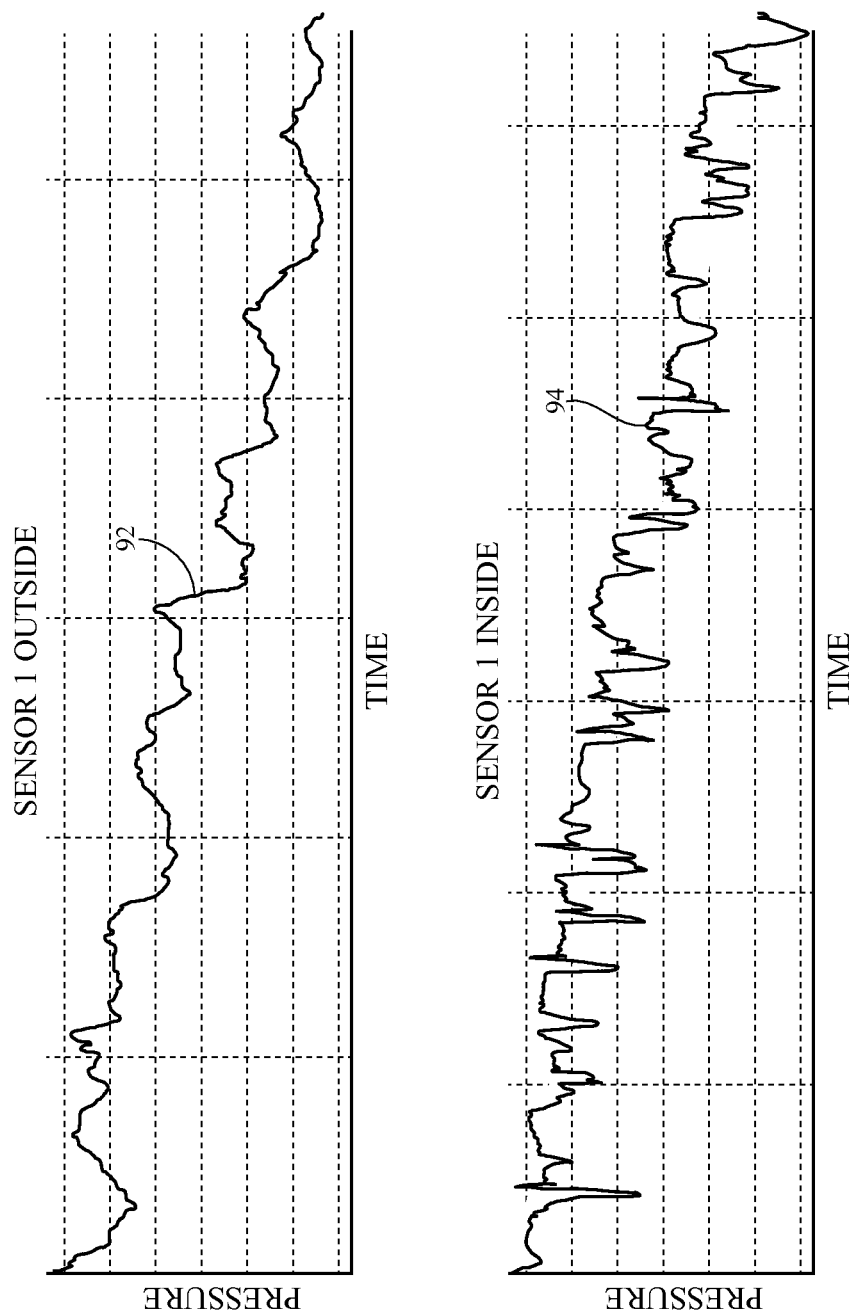
FIG. 11 shows illustrative pressure sensor data that may be used to determine whether an electronic device is inside or outside in accordance with an embodiment of the present invention.

FIG. 11 shows illustrative sensor data that may be used to determine whether an electronic device is inside or outside. The upper graph of FIG. 11 shows sensor data 92 gathered while sensor 1 (e.g., pressure sensor 50 of electronic device 10) is outdoors, while the lower graph of FIG. 11 shows sensor data 94 gathered while sensor 1 is indoors. Both sensor data 92 and sensor data 94 reflect long-term barometric pressure changes, but sensor data 94 gathered while device 10 is inside also reflects short-term pressure transients due to doors opening and closing and temperature-control systems turning on and off.

Control circuitry 40 may compare the gathered pressure sensor data from pressure sensor 50 with one or more predetermined pressure-versus-time waveforms stored in electronic device 10, may compare the gathered pressure sensor data with a predetermined threshold stored in electronic device 10, and/or may compare the gathered pressure sensor data with reference sensor data from an external pressure sensor. Control circuitry 40 may determine what type of environment electronic device 10 is operating in and may take suitable action based on the determined environment.

Figure 12:
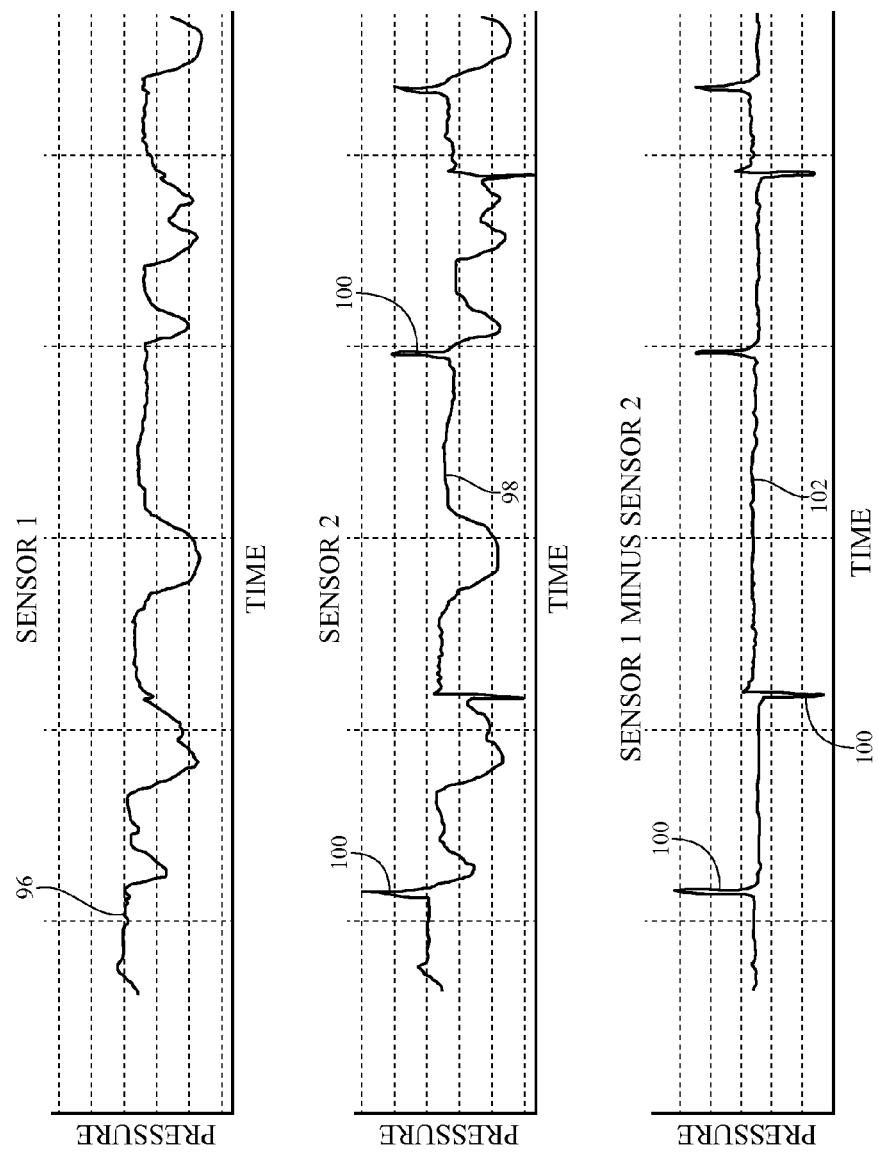
FIG. 12 shows illustrative pressure sensor data from first and second pressure sensors that may be used to detect when a door in a room is opened or closed in accordance with an embodiment of the present invention.

FIG. 12 shows illustrative sensor data that may be used to detect when a door opens or closes in a room. The upper graph of FIG. 12 shows sensor data 96 from pressure sensor 1 (e.g., pressure sensor 28 in device 20 or pressure sensor 30 in device 26). The middle graph of FIG. 12 shows sensor data 98 from pressure sensor 2 (e.g., pressure sensor 50 in electronic device 10). The lower graph of FIG. 12 shows calibrated sensor data 102 in which sensor data 98 from sensor 2 has been subtracted from sensor data 96 from sensor 1. In this illustrative scenario, sensor 2 is inside a 10 by 10 foot room in the building, whereas sensor 1 is outside the room in a common area of the building.

As shown in FIG. 12, sensor data from sensor 1 and sensor 2 have similar background signals due to short-term pressure transients common to the building. Pressure sensor 2, however, detects sharp fluctuations 100 in pressure when the door to the room is opened and closed, while pressure sensor 2 does not detect such fluctuations. The calibrated waveform 102 shows how short-term pressure transients common to the building can be removed such that fluctuations 100 associated with the opening and closing of doors are more reliably detected. The momentary decrease in pressure is indicative of a door opening, while the momentary increase in pressure is indicative of a door closing. The magnitude of fluctuations 100 depends on the speed at which the door is opened or closed. Faster door movement gives rise to a larger pressure change over a given time period relative to slower door movement.

Figure 13:
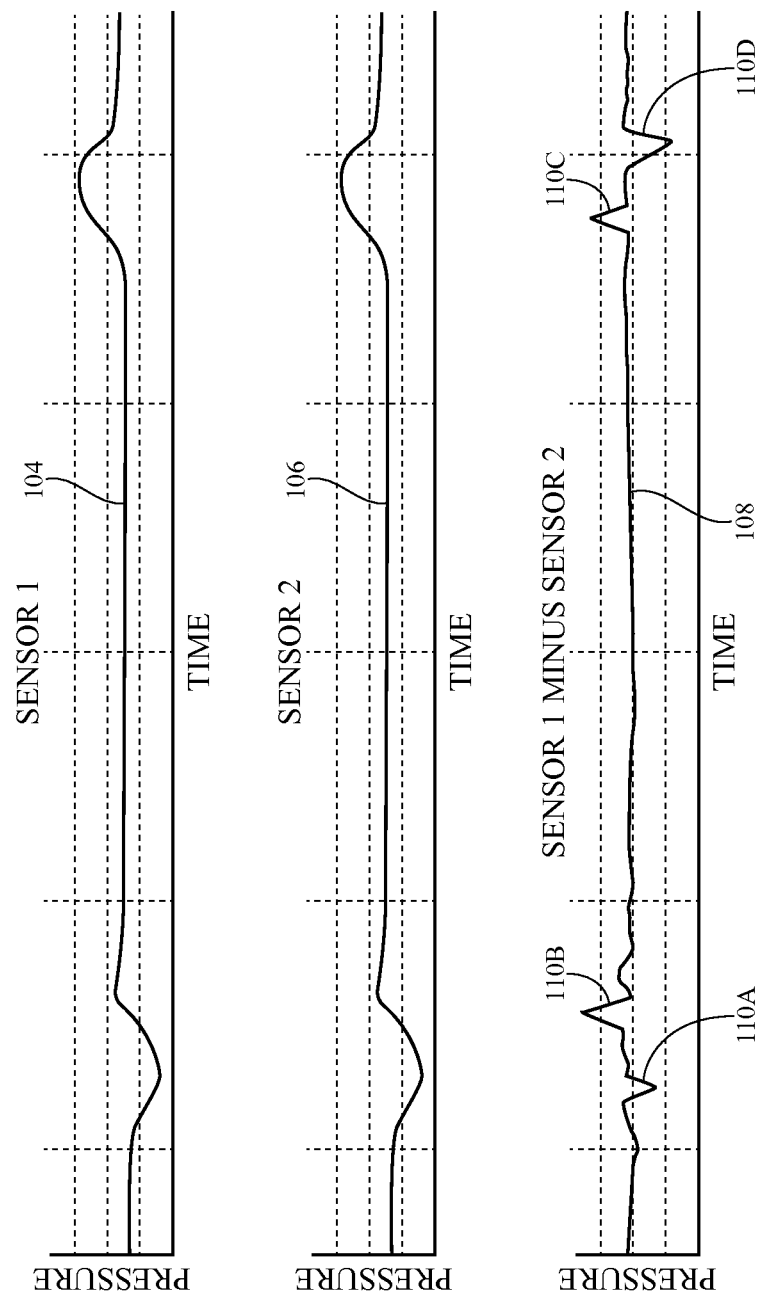
FIG. 13 shows illustrative pressure sensor data from first and second sensors that may be used to determine which door in a given room is opened or closed in accordance with an embodiment of the present invention.

FIG. 13 shows illustrative sensor data that may be used to detect which door in a given room is opened or closed. The upper graph of FIG. 13 shows sensor data 104 from sensor 1 (e.g., a first stationary sensor 30 associated with a first external device 26), the middle graph of FIG. 13 shows sensor data 106 from sensor 2 (e.g., a second stationary sensor 30 associated with a second external device 26), and the lower graph shows calibrated sensor data 108 in which sensor data 106 from sensor 2 has been subtracted from sensor data 104 from sensor 1. In this illustrative scenario, sensor 1 and sensor 2 may be located in the same building (in the same room if desired), but sensor 1 may be located further from a given door in the building than sensor 2. For example, sensor 1 may be located about 20 feed from the door, whereas sensor 2 may be located about 5 feet from the door.

As shown in FIG. 13, both pressure sensor 1 and pressure sensor 2 detect a drop in pressure when the door is opened, and a rise in pressure when the door is closed. However, as shown in the difference signal 108, the propagation time of sound causes the changes in pressure to be first recorded by sensor 2 closer to the door and then recorded by sensor 1 further from the door. The difference in arrival time of the pressure transient causes a characteristic dip 110A and subsequent rise 110B when the door is opened, and a characteristic rise 110C and subsequent dip 110D when the door is closed. Control circuitry associated with sensors 1 and 2 (e.g., control circuitry 40 of electronic device 10 or control circuitry in external equipment 20 or 26) may therefore compare the pressure sensor data from multiple pressure sensors in a given room or building to determine where the opened/closed door is relative to the sensors. This information may be useful for occupancy detection applications when it is desired to know whether a room is occupied.

Figure 14:
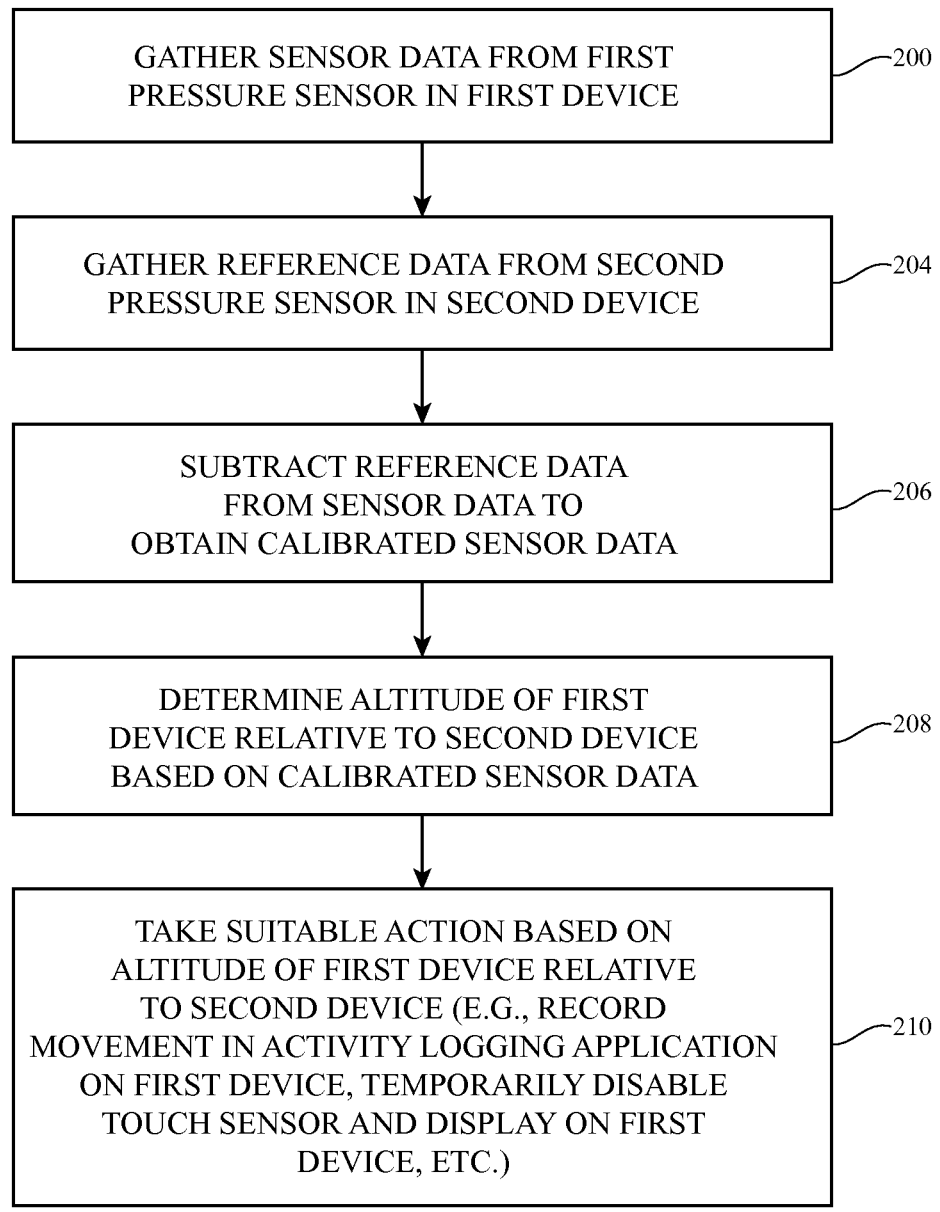
FIG. 14 is a flow chart of illustrative steps involved in operating an electronic device having pressure sensor structures for determining the altitude of the electronic device relative to another electronic device in accordance with an embodiment of the present invention.

FIG. 14 is a flow chart of illustrative steps involved in operating an electronic device having a pressure sensor for detecting the relative height of the electronic device.

At step 200, control circuitry 40 of electronic device 10 may gather sensor data from a first pressure sensor in electronic device 10 (e.g., sensor 50 of FIG. 2).

At step 202, control circuitry 40 of electronic device 10 may gather reference data from a second pressure in an external device (e.g., sensor 28 of device 20 or sensor 30 of device 26). This may include, for example, receiving the reference data over a wireless communications path. The pressure sensor data gathered in step 200 and step 202 may include pressure-versus-time waveforms and may correspond to overlapping periods of time.

At step 206, control circuitry 40 of electronic device 10 may subtract the reference data from the sensor data to obtain calibrated sensor data from which pressure transients common to both the sensor data and the reference data have been removed.

At step 208, control circuitry 40 of electronic device 10 may determine an altitude of electronic device 10 relative to the external device based on the calibrated signal. For example, control circuitry 40 may determine that electronic device 10 is lifted by a given vertical displacement relative to the external device when the pressure sensor data indicates that electronic device 10 has experienced a decrease in pressure relative to the external device. The magnitude of vertical displacement of electronic device 10 relative to the external device can be calculated from the magnitude of the pressure difference between the first and second pressure sensors.

At step 210, control circuitry 40 may take suitable action based on the altitude of electronic device 10 relative to the external electronic device. For example, if the relative altitude change indicates that electronic device 10 has been lifted to a user's ear for a telephone call, control circuitry 40 may temporarily disable the touch sensor and/or display of electronic device 10 so that the user does not inadvertently provide touch input during the telephone call.

As another example, the altitude change may be indicative of exercise or other activity, which in turn can be characterized and logged in an activity or fitness logging application running on electronic device 10. This may include stair climbing or other movements. For example, electronic device 10 may be on a user's arm or wrist, and the external device may be in the user's pocket or elsewhere in the room. Arm movements performed by the user during exercise may be tracked and logged using the pressure sensor data gathered during the exercise.

Figure 15:
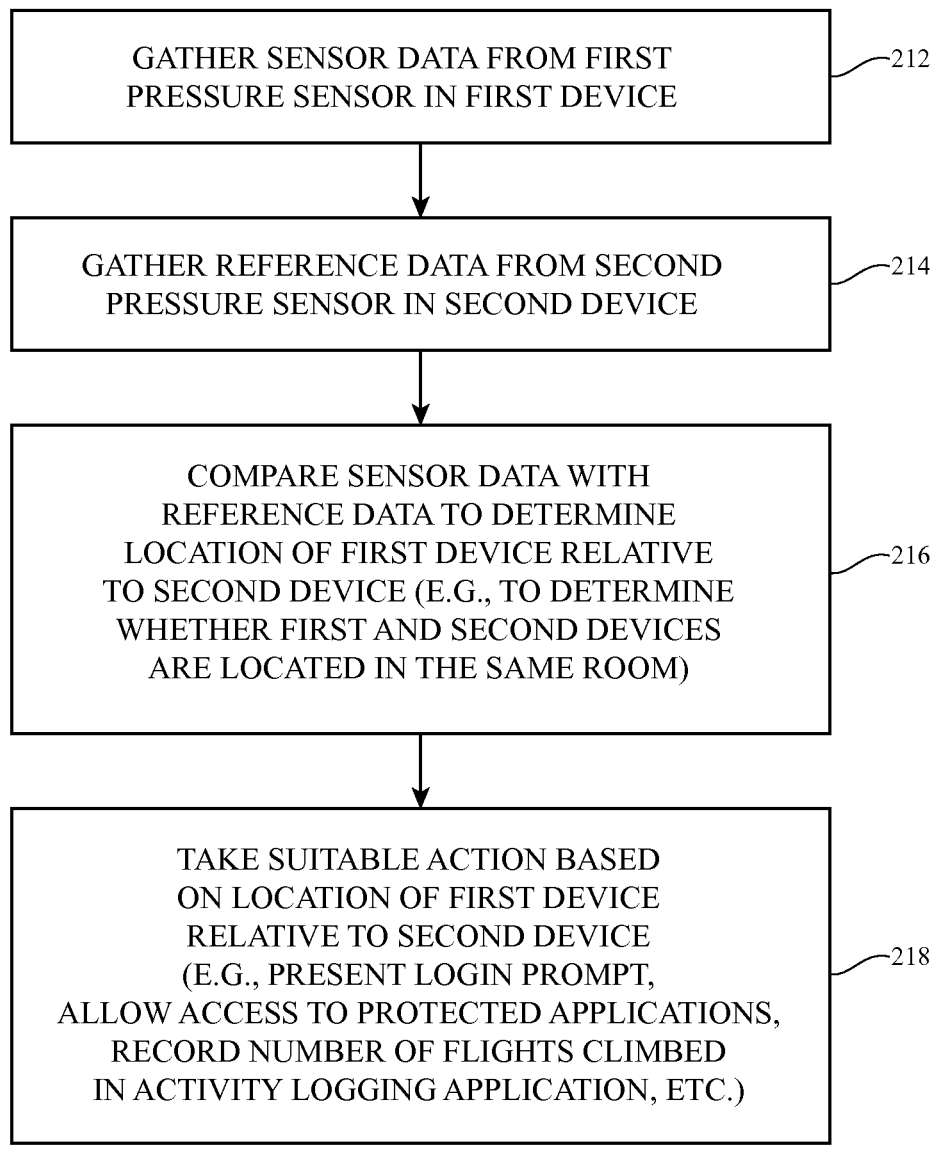
FIG. 15 is a flow chart of illustrative steps involved in operating an electronic device having pressure sensor structures for determining the location of an electronic device relative to another electronic device in accordance with an embodiment of the present invention.

FIG. 15 is a flow chart of illustrative steps involved in operating an electronic device having a pressure sensor for detecting the relative location of the electronic device.

At step 212, control circuitry 40 of electronic device 10 may gather sensor data from a first pressure sensor in electronic device 10 (e.g., sensor 50 of FIG. 2).

At step 214, control circuitry 40 of electronic device 10 may gather reference data from a second pressure in an external device (e.g., sensor 28 of device 20 or sensor 30 of device 26). This may include, for example, receiving the reference data over a wireless communications path. The pressure sensor data gathered in step 212 and step 214 may include pressure-versus-time waveforms and may correspond to overlapping periods of time.

At step 216, control circuitry 40 may compare the sensor data with the reference data to determine the location of the first device relative to the second device. This may include, for example, comparing sensor data of the type shown in FIGS. 8 and 9. In the FIG. 9 example, the pressure-versus-time waveform of the first sensor is nearly identical to the pressure-versus-time waveform of the second sensor, indicating that the two sensors are located in the same room. In the FIG. 10 example, the first and second sensors experience the same slight increase in pressure over a longer period of time, but the first sensor detects momentary dips and rises in pressure as a door nearby is opened and closed. This type of information would indicate that the first and second sensors are located in different rooms but may be in the same building.

At step 218, control circuitry 40 may take suitable action based on the location of electronic device 10 relative to the external device. For example, if control circuitry 40 determines that electronic device 10 and the external device are in the same room, electronic device 10 may provide a login prompt to the external device, may unlock features or protected applications in the external device, may synchronize content with the external device, may automatically login to the external device, etc.

In other scenarios, the pressure information may be used to determine a user's location indoors, which in turn may be used by activity logging applications to track the number of flights of stairs climbed or by other applications that use indoor location information. If desired, pressure sensor data may be combined with other location data (e.g., from a wireless network, a Global Positioning System receiver, etc.) to determine where electronic device 10 is located indoors.

Figure 16:
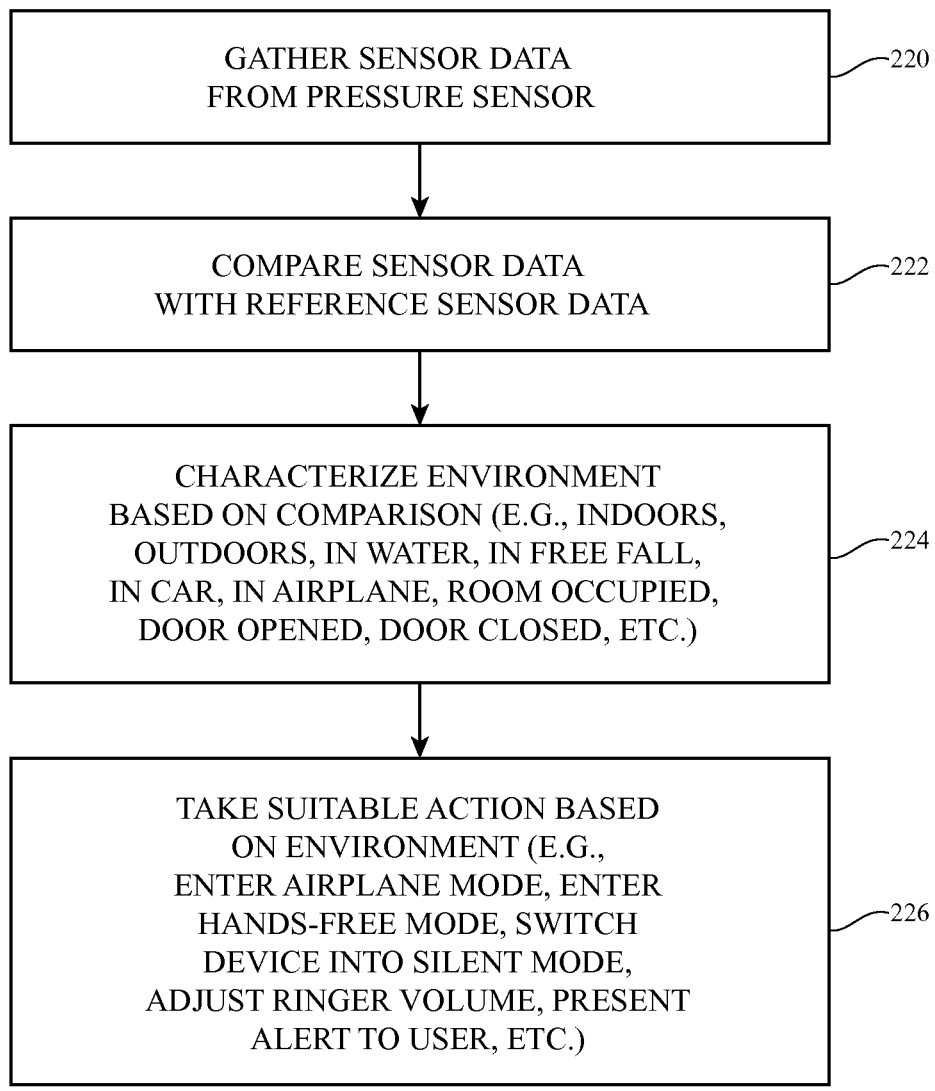
FIG. 16 is a flow chart of illustrative steps involved in operating an electronic device having pressure sensor structures for characterizing the environment around the electronic device in accordance with an embodiment of the present invention.

FIG. 16 is a flow chart of illustrative steps involved in characterizing the environment in which a user operates electronic device 10.

At step 220, control circuitry 40 of electronic device 10 may gather sensor data from a pressure sensor in electronic device 10 (e.g., sensor 50 of FIG. 2).

At step 222, control circuitry 40 may compare the sensor data with reference data. This may include, for example, comparing sensor data of the type shown in FIGS. 10, 11, and 12. The reference data that control circuitry 40 uses may be previously gathered sensor data, may be stored reference data having known characteristics of a particular environment, or may be newly gathered sensor data from a pressure sensor in an external device.

At step 224, control circuitry 40 may characterize the environment based on how the sensor data correlates with the reference sensor data. In the example of FIG. 11, sensor data from the pressure sensor in electronic device 10 is used to determine whether electronic device 10 is indoors or outdoors. In the example of FIG. 12, sensor data from multiple electronic devices is compared to determine whether a door has been opened or closed. In the example of FIG. 13, sensor data from multiple electronic devices is compared to determine which door in a given room has been opened or closed.

These examples are merely illustrative of different environments that can be detected with pressure sensor 50 of electronic device 10. In additional to distinguishing indoors from outdoors, the pressure sensor data may be characteristic to other environments such environments in cars, airplanes, moisture, etc. Characterizing the environment may also include determining whether electronic device 10 is in free fall or whether a given room is occupied (e.g., whether an intruder has entered a previously empty room).

At step 226, control circuitry 40 may take suitable action based on the environment in which electronic device 10 is being operated. For example, if the pressure sensor data indicates that electronic device 10 is in an airplane, control circuitry 40 may automatically switch electronic device 10 into airplane mode (e.g., may switch from a cellular network to a wireless local area network). If the pressure sensor data indicates that electronic device 10 is in a car, control circuitry 40 may automatically switch electronic device 10 into hands-free mode. Electronic device 10 may be automatically switched into silent mode when the device is indoors, whereas detecting that device 10 is outdoors may result in an automatic increase in ringer volume. If the pressure sensor data indicates that a room is occupied that should not be occupied, electronic device 10 may present an intruder alert to the user.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
pressure sensor structures that gather pressure data, wherein the pressure sensor structures comprise:
an array of microelectromechanical systems pressure sensors; and
processing circuitry that combines signals from the array of microelectromechanical systems pressure sensors to produce the pressure data;

wireless communications circuitry that receives reference pressure data from a reference pressure sensor in an external device; and control circuitry that determines a location of the electronic device relative to the external device based on the pressure data and the reference pressure data.

2. The electronic device defined in claim 1 wherein the pressure sensor structures comprises a microphone.

3. The electronic device defined in claim 2 wherein the microphone comprises a low-frequency microphone sensitive to frequencies below 1 Hz.

4. The electronic device defined in claim 1 wherein the control circuitry subtracts the reference pressure data from the pressure data to obtain calibrated pressure data in which background pressure fluctuations are reduced.

5. The electronic device defined in claim 4 wherein the control circuitry determines a vertical displacement of the electronic device relative to the external device based on the calibrated pressure data.

6. The electronic device defined in claim 5 further comprising:

a display having a touch sensor, wherein the control circuitry temporarily disables the display and the touch sensor based on the vertical displacement of the electronic device relative to the external device.

7. The electronic device defined in claim 1 wherein the control circuitry detects movement of a door in the vicinity of the electronic device based on the pressure data and the reference pressure data.

8. The electronic device defined in claim 7 wherein the control circuitry determines whether the electronic device or the external device is closer to the door based on the pressure data and the reference pressure data.

9. The electronic device defined in claim 1 wherein the control circuitry determines whether the electronic device and the external device are located in a common room based on the pressure data and the reference pressure data.

10. A method for operating a first electronic device, comprising:

with a pressure sensor in the first electronic device, gathering pressure data;

with wireless communications circuitry, receiving reference pressure data from a pressure sensor in a second electronic device, wherein the second electronic device comprises a wearable device;

with control circuitry, subtracting the reference pressure data from the pressure data to obtain calibrated pressure data; and determining a location of the first electronic device relative to the second electronic device based on the calibrated pressure data.

11. The method defined in claim 10 wherein determining the location of the first electronic device relative to the second electronic device comprises determining an altitude of the first electronic device relative to the second electronic device.

12. The method defined in claim 11 further comprising:

with the control circuitry, determining when the first electronic device is dropped by a user based on the altitude of the first electronic device relative to the second electronic device.

13. The method defined in claim 10 further comprising:

with a motion sensor in the first electronic device, gathering motion sensor data, wherein the control circuitry uses the motion sensor data and the calibrated pressure data to determine a number of flights of stairs climbed.

14. The method defined in claim 10 further comprising:

with the control circuitry, detecting when a user lifts the first electronic device to the user's ear based on the location of the first electronic device relative to the second electronic device.

15. The method defined in claim 10 wherein the wearable device comprises a wrist-watch device.

16. An electronic device, comprising:

at least one pressure sensor that gathers pressure data having a first pressure-versus-time waveform;

wireless communications circuitry that receives reference pressure data from an external device, wherein the reference pressure data has a second pressure-versus-time waveform; and control circuitry that determines whether the electronic device is in the same room as the external device by comparing the first and second pressure-versus-time waveforms.

17. The electronic device defined in claim 16 wherein the control circuitry determines whether the electronic device is in the same room as the external device based on short-term pressure fluctuations in the pressure data and the reference pressure data.

18. The electronic device defined in claim 16 wherein the at least one pressure sensor comprises an array of microelectromechanical systems pressure sensors, the electronic device further comprising:

processing circuitry that combines signals from the array of microelectromechanical systems pressure sensors to produce the pressure data.

19. The electronic device defined in claim 16 wherein the at least one pressure sensor comprises a microphone sensitive to frequencies below 1 Hz.

* * * * *